Dec. 31, 1963 R. E. PRESCOTT 3,116,365
ALIGNMENT DEVICE
Filed Dec. 18, 1961
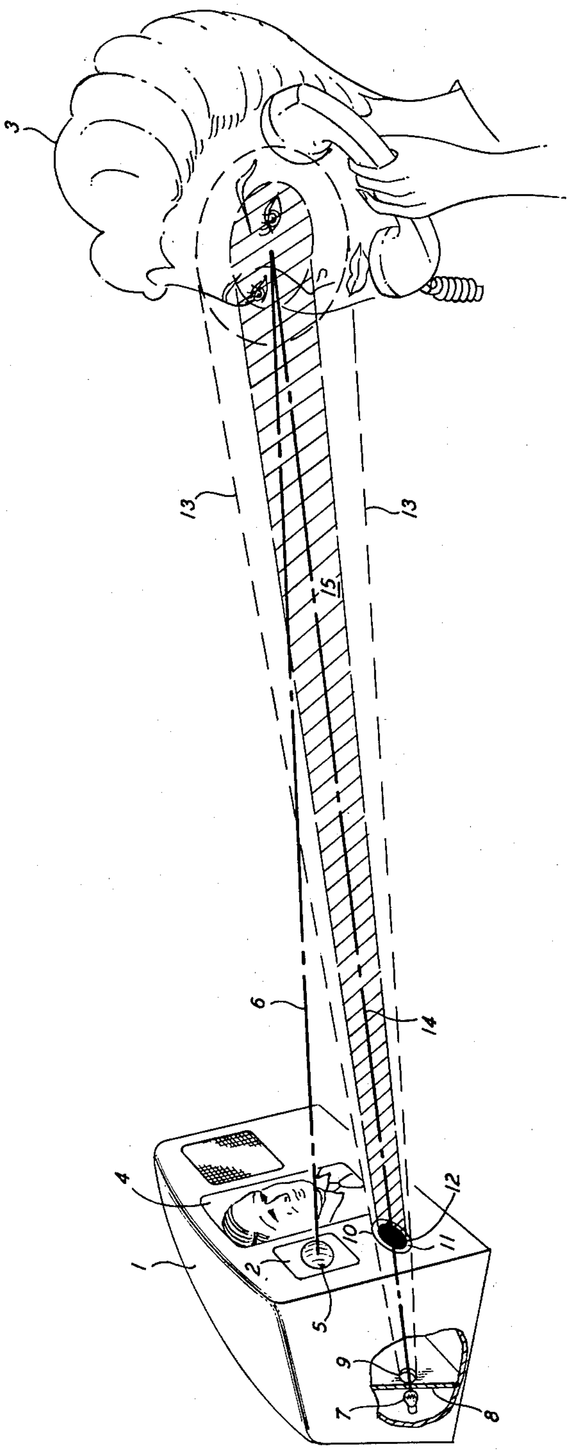
INVENTOR
R. E. PRESCOTT
BY V. P. Priolo
ATTORNEY United States Patent Office 3,116,365
Patented Dec. 31, 1963

3,116,365

ALIGNMENT DEVICE

Robert E. Prescott, Rumson, N.J., assignor to Bell Telephone Laboratories, Incorporated, New York, N.Y., a corporation of New York Filed Dec. 18, 1961, Ser. No. 160,170
3 Claims. (Cl. 178—5.6)

This invention relates to alignment apparatus for image reproduction systems, and more particularly, although in its broader aspects not exclusively, to equipment in combination with video telephone sets for providing visual indication to a subscriber that he is properly aligned with his television camera.

Video telephone sets are image reproduction devices for providing face-to-face communication between distant subscribers. Each set is generally provided with a television camera, for example a vidicon, equipped to sense and convert the image of a local subscriber into electrical signals for transmission to a remote subscriber, and a receiver designed to transform signals received from the remote subscriber into a visual image on the face of an output tube. An example of a video communication system embodying the apparatus described above and designed to operate over existing telephone lines is disclosed in United States Patent 2,895,005, issued to W. E. Kock et al. on July 14, 1959.

One problem arising in connection with the use of video telephone sets is for the local subscriber to align himself with his television camera. Obviously, the most satisfactory solution to this problem should involve only a minimum of subscriber diversion from his viewing screen. In the past, several alternative arrangements have been proposed as solutions to this problem, among them, as described in the above-noted Kock et al. patent, a circular frame positioned in front of the set by a rod such that when a subscriber views his screen through the frame, and is situated a predetermined distance from his set, he is in proper alignment with his camera. While such an arrangement provides a satisfactory indication of alignment, a frame being positioned intermediate the subscriber and the screen is somewhat distracting, in addition to which the presence of a solid object protruding outwardly from the front of the set does not easily lend itself to attractive design. A second proposed solution to this problem includes a switching circuit connected to both the camera and receiver of a local subscriber's set in such manner that the local subscriber's image is periodically reproduced on his own screen, and from this image he may realign himself accordingly. As was the case with the first proposed solution, however, this also is functionally satisfactory, but contains drawbacks such as the additional electrical equipment required and, in the general case, the distraction of having the information received from the remote subscriber being periodically interrupted.

Accordingly, the principal object of this invention is to indicate with maximum simplicity, yet minimum distraction, to one being televised, or otherwise having his image reproduced by a camera or similar device, that he is properly aligned with the optical axis of the apparatus sensing his image.

According to the invention, an image reproduction system comprising a camera and means associated with the camera for sensing images to be reproduced which lie along a first axis, includes a device for projecting a hollow conical beam of electromagnetic energy, for example light, along a second axis, the device being so positioned with respect to the sensing means that the first and second axes intersect each other. More specifically, the above-mentioned elements are disposed in such manner that the axes intersect where the eyes of a person whose image is being reproduced are situated when that person is in proper focus of the camera. By these means, when a person being televised, or otherwise focused upon, is properly aligned with the camera, his eyes are circumscribed by the beam; and should he drift out of alignment, his eyes would then be exposed to the beam, thereby indicating to him that his position need be corrected.

The invention will be more thoroughly understood by reference to the following specification describing in detail one illustrative embodiment of the invention, in conjunction with the single sheet drawing which depicts the invention conveniently embodied in a video telephone set.

With reference to the drawing, the invention is shown embodied in a video telephone set comprising a cabinet 1 which houses a television camera 2 for sensing and converting the image of a local subscriber 3 into electrical signals, and a video output tube having a screen 4 upon which is produced the image of the remote subscriber, that is to say, the party with whom the local subscriber is conversing. As is conventional, camera 2 includes a lens member 5 which functions to bring the image of the local subscriber into proper focus.

As shown in the drawing a light source 7 is mounted in cabinet 1 behind a plate 8 in such manner that a beam of light emanating from source 7 is directed toward the local subscriber through an aperture 9 disposed in the plate. Light source 8 may be powered in any of a number of conventional ways, for example by a cord connection (not shown) to a standard power outlet. The beam emanating from the interior of cabinet 1 is intercepted at the face of the set by an oval member 10 situated slightly below camera 2 which comprises an outer ring 11 composed of a light transmitting substance circumscribing a centrally disposed mask 12. It should be evident from the drawing that the resulting light rays directed toward the local subscriber form a conical beam 13 centered along an axis 14 having a dark, or hollow, interior 15.

According to the invention, light source 7, aperture 9 and oval member 10 are so oriented with respect to lens member 5 of camera 2 that axes 6 and 14 intersect each other at the eye region of a local subscribed who is axially aligned with and in proper focus of lens member 5. If these elements are so arranged, and oval member 10 is of proper dimension, a cross-section of beam 13 forms an oval ring circumscribing the eyes of a properly positioned local subscriber. Thus, the local subscriber will have her eyes shielded from the light source by mask 12 when she is properly aligned and in focus with lens member 5, but should she stray out of alignment in any direction, her eyes will be exposed to beam 13 thereby indicating that her position need be corrected. It is to be noted that the invention is particularly advantageous in that a subscriber experiences substantially no distraction from these means when she is properly positioned, and when out of alignment, is able to sense the beam 13 impinging upon her retina even though her attention is almost totally directed to the image appearing on screen 4. It should be understood without further explanation that by means of elementary mechanical expedients the camera and the light projecting apparatus may be linked together on movable mounts for convenient adjustment to compensate for differing heights of various subscribers.

Although only a single embodiment of the invention has been described herein, it is to be understood that numerous other arrangements and adaptations may be derived without departing from the spirit and scope of the invention.

What is claimed is:

1. A video telephone set comprising a cabinet, a television camera housed in said cabinet for televising the image of a local subscriber to a remote subscriber, a lens system associated with said camera for focusing the image of said local subscriber to be televised by said camera, the field of said lens system being directed along an axis, means disposed in said cabinet for projecting a beam of light substantially coaxial with said axis toward said local subscriber, and masking means disposed in the path of said beam for obstructing a central section of said beam.

2. A video telephone set comprising a cabinet, a television camera housed in said cabinet for televising the image of a local subscriber to a remote subscriber, a lens system associated with said camera for focusing the image of said local subscriber to be televised by said camera, the field of said lens system being directed along a first axis, means disposed in said cabinet for producing a beam of light energy directed toward said local subscriber, and masking means integral with the face of said cabinet and interposed between said beam producing means and said local subscriber, said masking means comprising a transparent ring disposed on a field of nontransparent material.

3. A video telephone set comprising a cabinet; a television camera housed in said cabinet for televising the image of a local subscriber to a remote subscriber; a lens system associated with said camera for focusing the image of said local subscriber to be televised by said camera; said camera being mounted in such manner that the field of said lens system is directed along a first axis projecting from the front of said cabinet; a source of light energy disposed in said cabinet; a plate having an aperture disposed therein mounted in said cabinet intermediate said source and the front of said cabinet; a ring of light transmitting material situated on the front of said cabinet; said ring circumscribing a region comprising a substance constructed to transmit less light per unit of surface area than said light transmitting material; said source, said aperture and said ring being positioned such that a conical beam of light is emitted from the front of said cabinet characterized by a relatively bright surface margin and a relatively dark interior; said source, said aperture and said ring being further positioned in such manner that the eyes of said local subscriber are circumscribed by a cross section of said bright surface margin when said local subscriber is in proper alignment with said camera.

References Cited in the file of this patent

UNITED STATES PATENTS

| | | |
|---|---|---|
| 2,282,045 | Fleischer | May 5, 1942 |
| 2,420,198 | Rosenthal | May 6, 1947 |
| 2,816,475 | Waller | Dec. 17, 1957 |